United States Patent
Desbois et al.

(10) Patent No.: US 7,101,941 B2
(45) Date of Patent: Sep. 5, 2006

(54) METHOD FOR ANIONIC POLYMERIZATION OF α-METHYLSTYRENE

(75) Inventors: Philippe Desbois, Maikammer (DE); Michael Ishaque, Mannheim (DE); Christian Schade, Ludwigshafen (DE); Alain Deffieux, Bordeaux (FR); Stéphane Carlotti, Talence (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/545,945

(22) PCT Filed: Jan. 28, 2004

(86) PCT No.: PCT/EP2004/000704

§ 371 (c)(1),
(2), (4) Date: Aug. 17, 2005

(87) PCT Pub. No.: WO2004/074332

PCT Pub. Date: Sep. 2, 2004

(65) Prior Publication Data

US 2006/0160971 A1    Jul. 20, 2006

(30) Foreign Application Priority Data

Feb. 19, 2003   (DE)   ................. 103 07 058

(51) Int. Cl.
*C08F 4/46* (2006.01)
*C08F 12/12* (2006.01)

(52) U.S. Cl. .................. 526/177; 526/347; 526/347.1; 525/272

(58) Field of Classification Search ................ 526/177, 526/347, 347.1; 525/272
See application file for complete search history.

(56) References Cited

U.S. PATENT DOCUMENTS

| | | | |
|---|---|---|---|
| 3,716,495 A | | 2/1973 | Hsieh |
| 4,302,559 A | * | 11/1981 | Naylor ...................... 525/271 |
| 6,300,441 B1 | | 10/2001 | Schade et al. |
| 6,303,721 B1 | | 10/2001 | Latsch et al. |
| 6,444,762 B1 | | 9/2002 | Fischer et al. |
| 2003/0135000 A1 | * | 7/2003 | Andrekanic et al. ........ 526/237 |

FOREIGN PATENT DOCUMENTS

| | | |
|---|---|---|
| DE | A-198 06 772 | 8/1999 |
| DE | 102 18 161 | 4/2002 |
| WO | WO 98/07765 | 2/1998 |

OTHER PUBLICATIONS

0050/53451 English Translatino of DE 102 18 161.
Uolystyrene and Styrene Copolymers, Ullmann's Enzyklopadie der Technischen Chemie, vol. A21, VCH Verlag Weinheim 1992, pp. 615-625.

* cited by examiner

*Primary Examiner*—Fred Teskin
(74) *Attorney, Agent, or Firm*—Connolly Bove Lodge & Hutz LLP; Matthew J. Mason

(57) ABSTRACT

Process for preparing homopolymers of α-methylstyrene, or copolymers of α-methylstyrene and comonomers, by anionic polymerization in the presence of an initiator composition, which comprises using an initiator composition in which potassium hydride and at least one organylaluminum compound are present.

11 Claims, No Drawings

METHOD FOR ANIONIC POLYMERIZATION OF α-METHYLSTYRENE

CROSS-REFERENCE TO RELATED APPLICATION

The present application is a National Stage Application of PCT/EP2004/000704 filed Jan. 28, 2004, which claims priority from German Application no. DE/03 07 058.3, filed Feb. 19, 2003.

The invention relates to a process for preparing homopolymers of α-methylstyrene, or copolymers of α-methylstyrene and comonomers, by anionic polymerization in the presence of an initiator composition, which comprises using an initiator composition in which potassium hydride and at least one organylaluminum compound are present.

The invention further relates to homopolymers of α-methylstyrene or copolymers of α-methylstyrene and comonomers, obtainable by the process mentioned, to the use of these homo- or copolymers for producing moldings, films, fibers, or foams, and finally to the moldings, films, fibers, or foams composed of the homo- or copolymers mentioned.

When compared with polystyrene or copolymers of styrene, poly-α-methylstyrene and copolymers of α-methylstyrene feature in particular better thermal properties, e.g. increased heat resistance, in particular better heat distortion temperature. If some or all of the styrene is replaced by α-methylstyrene during the preparation of styrene homo- or copolymers, the maximum service temperature of the resultant polymers and of moldings produced therefrom, is markedly higher, and the materials can therefore be used in demanding applications.

The method for preparing homo- and copolymers of α-methylstyrene may be similar to that for the preparation of the corresponding homo- or copolymers of styrene. To prepare standard polystyrene (GPPS, general purpose polystyrene), and toughened polystyrene (HIPS, high impact polystyrene), there are various known processes which proceed by a continuous or batchwise, free-radical or anionic route, in solution or in suspension, and reference may be made by way of example to Ullmanns Enzyklopadie der Technischen Chemie, Vol. A21, VCH Verlag Weinheim 1992, pp. 615–625. In the HIPS process, a rubber (e.g. polybutadiene or styrene-butadiene block copolymers) is prepared by an anionic or free-radical route, for example, and dissolved in monomeric styrene. The styrene is then polymerized by a free-radical or anionic route, for example. During polystyrene formation, phase inversion occurs: in the end product, the rubber phase is in dispersion in a polystyrene matrix.

The standard or toughened polystyrenes obtained by anionic polymerization have some advantages over the products obtained by free-radical synthesis, including lower contents of residual monomer and oligomer. In free-radical polymerization, the reaction proceeds via free radicals, and use is made of peroxidic initiators, for example, whereas anionic polymerization proceeds via "living" carbanions, examples of initiators used being organyl compounds of an alkali metal.

Compared with free-radical polymerization, anionic polymerization proceeds substantially more rapidly and leads to higher conversions. The high reaction rate makes temperature control of the exothermic reaction difficult. This can be countered by using what are known as retarders (e.g. organyl compounds of Al, of Zn, or of Mg), which lower the reaction rate. In anionic rubber preparation, the increase in viscosity of the reaction mixture is generally so fast that dilution with an inert solvent is required.

DE-A 198 06 772 discloses initiator compositions made from an organyl alkali metal compound (i.e. alkyl, aryl, or aralkyl alkali metal compound), e.g. sec-butyllithium, and from an organylaluminum compound, e.g. triisobutylaluminum (TIBA), and their use for the polymerization of vinylaromatics and dienes.

U.S. Pat. No. 3,716,495 teaches initiator compositions made from a) organolithium compounds $RLi_x$ where $R = C_{1-20}$-alkyl, -aryl, -cycloalkyl, -alkaryl, or -aralkyl, for example n- or sec-butyllithium, b) organylmetal compounds $R_nM$, where R is as defined above and M=a metal from the groups 2a (alkaline earth metals), 2b (zinc group), and 3a (boron group), e.g. diethylzinc or organylaluminum compounds, and c) polar compounds, such as tetrahydrofuran (THF). They are used for the polymerization of dienes and vinylaromatics.

A disadvantage of the use of initiators which comprise organolithium compounds (organyllithium compounds), for example n-, sec-, or tert-butyllithium, is the high price of the organyllithium compounds, which makes the final polymer product more expensive.

A difference from the two initiator compositions disclosed above is that the initiators of the invention comprise potassium hydride, i.e. an alkali metal hydride without organyl radicals.

WO-A 98/07765 discloses initiators for anionic polymerization, comprising the organylmetal compounds $R^1M^1$ where
  $M^1$=Li, Na, K
  $R^1$=hydrogen, $C_{1-10}$-alkyl, $C_{6-20}$-aryl, $C_{7-20}$-alkyl-substituted aryl, and $R^2 nM^2$ where
  $M^2$=n-valent element of groups 2a, 2b, or 3a of the Periodic Table,
  $R^2$=hydrogen, halogen, $C_{1-20}$-alkyl, $C_{6-20}$-aryl.

The WO specification also discloses an appropriate polymerization process for styrene monomers or diene monomers.

The present invention is a selection invention with respect to WOA 98/07765, in that hydrogen alone has been selected for $R^1$, potassium alone has been selected for $M^1$, and aluminum alone has been selected for $M^2$.

The earlier application, DE file reference 102 18 161.6 (application date Apr. 23, 2002), which is not a prior publication, describes a process for the anionic homo- and copolymerization of styrene monomers, or diene monomers, or a mixture of these, in the presence of an initiator composition in which at least one alkali metal hydride selected from LiH, NaH, and KH, and at least one organylaluminum compound, are present. No mention is made in the application of α-methylstyrene as styrene monomer, and in the examples, of which there are 26 in total, there is no use either of α-methylstyrene as monomer or of potassium hydride as initiator composition constituent.

The processes of the prior art do not always provide ideal cost-effectiveness.

It is an object of the present invention to eliminate the disadvantages described. A particular object is to provide an alternate anionic polymerization process for α-methylstyrene homo- and copolymers. The process should be more cost-effective than the processes known hitherto.

We have found that this object is achieved by way of the process described at the outset, and also by way of the homoand copolymers described at the outset, their use, and the moldings, films, fibers, and foams. Preferred embodiments of the invention are found in the subclaims.

The process of the invention prepares homopolymers of α-methylstyrene, or copolymers of α-methylstyrene and comonomers, by anionic polymerization in the presence of an initiator composition. Potassium hydride KH is present as alkali metal hydride in the initiator composition, and at least one organylaluminum compound (organoaluminum compound) is also present.

It is likely that the potassium hydride acts as initiator for anionic polymerization, insofar as it is present in solution in the solvent (usually non-polar, inert hydrocarbons). The organylaluminum compound improves the solubility of the potassium hydride in the solvent, probably via complexing, and thus improves the effectiveness of the potassium hydride. In addition, the organylaluminum compound reduces the rate of polymerization of the monomers (acting as what is known as a retarder).

Potassium hydride may be prepared in a manner known per se from metallic potassium and gaseous hydrogen at superatmospheric pressure and at an elevated temperature. However, it is also obtainable in the chemicals market, for example in the form of a pure solid or of a suspension, e.g. in an inert hydrocarbon.

In addition to potassium hydride, concomitant use may be made of other alkali metal hydrides, such as sodium hydride or lithium hydride. However, the alkali metal compound used is preferably potassium hydride alone.

The amount of potassium hydride needed depends inter alia on the desired molecular weight (molar mass) of the polymer to be prepared, on the type and amount of organylaluminum compounds used, and on the polymerization temperature. The amount used is generally from 0.0001 to 10 mol %, preferably from 0.001 to 5 mol %, and particularly preferably from 0.01 to 1 mol %, of potassium hydride, based on the total amount of monomers used.

Organylaluminum compounds which may be used are monoorganyl compounds $RH_2Al$, diorganyl compounds $R_2HAl$, and—preferably—triorganyl compounds $R_3Al$. These radicals R may be identical or different and each independently of one another is hydrogen, halogen, $C_1$–$C_{20}$-alkyl, $C_6$–$C_{20}$-aryl, or $C_7$–$C_{20}$-alkyl-substituted aryl. Preferred organylaluminum compounds are the trialkylaluminum compounds, such as triethylaluminum, triisobutylaluminum, tri-n-butylaluminum, triisopropylaluminum, tri-n-hexylaluminum. It is particularly preferable to use triisobutylaluminum (TIBA).

The organylaluminum compounds used may also be those produced by partial or complete hydrolysis, alcoholysis, aminolysis, or oxidation of alkyl- or arylaluminum compounds, or those which bear alcoholate, thiolate, amide, imide, or phosphide groups. Examples are diethylaluminum (N,N-dibutylamide), diethylaluminum ethoxide, diisobutylaluminum ethoxide, diisobutyl-(2,6-di-tert- butyl-4-methylphenoxy)aluminum (CAS No. 56252-56-3), methylaluminoxane, isobutylated methylaluminoxane, isobutylaluminoxane, tetraisobutyldialuminoxane, and bis (diisobutyl)aluminum oxide.

The organylaluminum compounds are obtainable in a manner known per se or may be purchased in the form of commercially available products.

The amount of organylaluminum compound required depends inter alia on the amount of potassium hydride, and on the polymerization temperature. The amount used is usually from 0.0001 to 10 mol %, preferably from 0.001 to 5 mol %, and in particular from 0.01 to 1 mol %, of organylaluminum compound, based on the total amount of monomers used.

The molar ratio of potassium hydride (initiator) to organylaluminum compound (retarder) in the initiator composition may vary within wide limits. It depends, for example, on the desired retarding action, on the polymerization temperature, on the nature and amount (concentration) of the monomers used, and on the desired molecular weight of the polymer. The molar ratio mentioned is usefully expressed as molar ratio of aluminum to potassium, Al/K. In one preferred embodiment it is from 0.2:1 to 10:1, particularly preferably from 0.2:1 to 5:1, and in particular from 0.2:1 to 2:1.

To prepare the initiator composition, it is usual to mix the potassium hydride and the organylaluminum compound, preferably with concomitant use of a solvent or suspension medium (depending on the solubility of the potassium hydride or of the organylaluminum compound, the term solvent being used below for brevity).

Particularly suitable solvents are inert hydrocarbons, more specifically aliphatic, cycloaliphatic, or aromatic hydrocarbons, such as cyclohexane, methylcyclohexane, pentane, hexane, heptane, isooctane, benzene, toluene, xylene, ethylbenzene, decalin, or paraffin oil, or a mixture of these. Toluene is particularly preferred.

In one preferred embodiment, the potassium hydride is used as it stands, i.e. as a dry solid. In another preferred embodiment, the organylaluminum compound is used in solution in an inert hydrocarbon, e.g. toluene.

The temperature during the preparation of the initiator composition depends on the concentration, on the nature of the metal compounds, and on the solvent. The entire temperature range between the freezing point and boiling point of the mixture is usually suitable. It is advantageous to operate in the range from 0 to 250° C., preferably in the range from 20 to 200° C., in particular at from 20 to 120° C.

The aging or standing of the freshly prepared initiator composition is advantageous for reproducible use in anionic polymerization. Experiments have shown that initiator components which are used separately from one another or are mixed only briefly prior to the initiation of the polymerization bring about polymerization conditions and polymer properties which have poor reproducibility. The aging process observed is probably attributable to complexing of the metal compounds, which proceeds more slowly than the mixing procedure.

An aging time of about 2 minutes is generally sufficient for the range of concentration and temperature given above. The homogeneous mixture is preferably allowed to age for at least 5 minutes, in particular at least 20 minutes. However, if the homogeneous mixture is allowed to age for a number of hours, e.g. from 1 to 480 hours, this again does not generally have an adverse effect.

Styrene or α-methylstyrene may also be added to the initiator composition. In this case, an oligomeric polystyryl anion is obtained, and has the organylmetal compounds complexed onto the end of its chain. It is preferable to use amounts in the range from 10 to 1000 mol % of styrene or α-methylstyrene, based on potassium hydride.

The initiator components may be mixed in any mixing assembly, preferably in those which can be charged with an inert gas. Examples of suitable assemblies are stirred reactors with an anchor stirrer or vibrating vessels. Heatable tubes with static mixing elements are particularly suitable for continuous preparation. The mixing procedure is needed for homogeneous mixing of the initiator components. Mixing can, but need not, continue while the mixture is allowed to age. The mixture may also be allowed to age in a stirred tank through which materials flow continuously, or in a tube section, the volume of which together with the throughput rate determines the aging time.

The invention therefore also provides the inventive process mentioned for preparing homopolymers of α-methylstyrene, or copolymers of α-methylstyrene and comonomers, wherein the initiator composition is prepared by mixing potassium hydride and the organylaluminum compound suspended or dissolved in an inert hydrocarbon, and permitting the mixture to age at a temperature of from 0 to 250° C. for at least 2 minutes.

Comonomers which may be used for the inventive process are in principle any of the monomers which are copolymerizable with α-methylstyrene. Comonomers (other than α-methylstyrene) whose use is preferred are styrene monomers, or diene monomers, or a mixture of these.

Suitable styrene monomers are any of the vinylaromatic monomers, e.g. styrene, p-methylstyrene, p-tert-butylstyrene, ethylstyrene, vinylstyrene, vinylnaphthalene, and 1,1-diphenylethylene. It is preferable to use styrene.

Examples of diene monomers which may be used are 1,3-butadiene, 2,3-dimethylbutadiene, 1,3-pentadiene, 1,3-hexadiene, isoprene, and piperylene. 1,3-Butadiene and isoprene are preferred, in particular 1,3-butadiene (the abbreviated name butadiene being used below).

Comonomers whose use is particularly preferred are styrene, butadiene, isoprene, or a mixture of these.

It is advantageous for the monomers used to have the purity typically required for the process, i.e. troublesome impurities such as residual moisture, polar substances, and oxygen are removed immediately prior to polymerization in a manner known per se.

The total proportion of the comonomers (entirety of all of the comonomers) is usually from 0.1 to 99.9% by weight, preferably from 0.1 to 99% by weight, and in particular from 0.1 to 90% by weight, based on the total amount of the monomers. This means that the proportion of α-methylstyrene in the comonomers is from 0.1 to 99.9% by weight, preferably from 1 to 99.9% by weight, and in particular from 10 to 99.9% by weight.

If styrene is used as sole comonomer, the proportion of styrene is generally from 0.1 to 99.9% by weight, preferably from 10 to 99.9% by weight, and in particular from 50 to 99.9% by weight. In the case of butadiene or isoprene as sole comonomer, the proportion of butadiene or of isoprene is usually from 0.1 to 99.9% by weight, preferably from 1 to 99% by weight, and in particular from 5 to 70% by weight.

If styrene and butadiene, or styrene and isoprene, are the only two comonomers used, the proportion of styrene is generally from 0.1 to 99.9% by weight, preferably from 10 to 99.9% by weight, and in particular from 50 to 99.9% by weight, and the proportion of butadiene or of isoprene is generally from 0.1 to 99.9% by weight, preferably from 0.1 to 90% by weight, and in particular from 0.1 to 50% by weight. All of the abovementioned proportions by weight are based on the total amount of monomer.

During the polymerization reaction, concomitant use may also be made of polar compounds or Lewis bases. Any of the additives known from the literature for anionic polymerization is in principle suitable. The additives generally contain at least one O, N, S or P atom which has a free electron pair. Preference is given to ethers and amines, e.g. tetrahydrofuran, diethyl ether, tetrahydropyran, dioxane, crown ethers, alkylene glycol dialkyl ethers, e.g. ethylene glycol monoethyl ether, ethylene glycol dimethyl ether, N,N,N',N'-tetramethylethylenediamine, N,N,N',N",N"-pentamethyldiethylenetriamine, 1,2-bis(piperidino)ethane, pyridine, N,N,N',N',N",N"-hexamethyltriethylenetriamine, and hexamethylphosphoramide.

The polar compounds or Lewis bases act as an activator and in many cases increase the conversion in the polymerization reaction or raise the reaction rate. They can also control the proportions of the different vinyl linkages in styrene-butadiene block copolymers or in styrene-isoprene block copolymers, in which connection see below, and thus affect the microstructure of the rubber. If they increase the reaction rate, their amount is advantageously judged so that the reaction rate of the entire mixture is lower than that for a mixture which uses no addition of the retarding components. To this end, use is made of less than 500 mol %, preferably less than 200 mol %, and in particular less than 100 mol %, of the polar compound or Lewis base, based on the initiator composition.

The process of the invention may be carried out in the presence (solution polymerization) or absence (bulk polymerization) of a solvent. With no solvent, operations are generally carried out at above 100° C., these being temperatures at which polymer melts may also be handled.

Suitable solvents for the anionic polymerization are the usual aliphatic, cycloaliphatic, or aromatic hydrocarbons having from 4 to 12 carbon atoms, for example pentane, hexane, heptane, cyclohexane, methylcyclohexane, isooctane, decalin, benzene, alkylbenzenes, such as toluene, xylene, ethylbenzene, or cumeme, or a suitable mixture. The solvent should be of the purity typically required for the process. To remove substances with active protons, it may be dried over aluminum oxide or molecular sieve, for example, and/or distilled prior to use. The solvent from the process is preferably reused after condensation of the solvent vapors and the purification mentioned.

In solution polymerization, operations are usually carried out at from 0 to 250° C., preferably from 20 to 200° C.

It is possible to adjust the retardant action within wide temperature ranges via the selection of composition and amount of the organylaluminum compounds. For example, it is even possible to use starting monomer concentrations in the range from 50 to 100 percent by volume, in particular from 70 to 100 percent by volume, for the polymerization. These give high-viscosity polymer solutions and, at least for relatively high conversions, demand relatively high temperatures.

Once the polymerization has ended, the living polymer chains may be capped by a chain terminator. Suitable chain terminators are substances with active protons or Lewis acids, examples being water, alcohols, such as methanol or isopropanol, aliphatic or aromatic carboxylic acids, such as 2-ethylhexanoic acid, and also inorganic acids, such as carbonic acid or boric acid.

The process of the invention may be carried out in any reactor which can withstand pressure and heat, and in principle it is possible to use back-mixing or non-back-mixing reactors (i.e. reactors with stirred tank behavior or tubular reactor behavior). Depending on the selection of the initiator concentration and initiator composition, of the specific process sequence used, and other parameters, such as temperature and, if desired, temperature program, the process leads to polymers with high or low molecular weight. Examples of suitable equipment are stirred tanks, tower reactors, loop reactors, and also tubular reactors or tube-bundle reactors, with or without internals. Internals may be static or movable internals.

Besides the polymerization process described above, the invention also provides the polymers obtainable by the polymerization process, i.e. homopolymers of α-methylstyrene, and copolymers of α-methylstyrene and comonomers.

Examples of these copolymers are those selected from α-methylstyrene-styrene copolymer, toughened polystyrene containing α-methylstyrene units, and styrene-butadiene block copolymers containing α-methylstyrene units. α-methylstyrene-styrene copolymer is also termed poly-α-methylstyrene-styrene (PS/α-MeS).

Toughened polystyrene containing α-methylstyrene units is toughened (i.e. rubber-containing) polystyrene in which some or all of the styrene has been replaced by α-methylstyrene. Styrene-butadiene block copolymers containing α-methylstyrene units are styrene-butadiene block copolymers in which some or all of the styrene in at least one styrene block has been replaced by α-methylstyrene.

In the block copolymers below, a block composed of styrene or of α-methylstyrene, or of styrene and α-methylstyrene is referred to by the abbreviated and simplified term styrene block S.

The inventive α-methylstyrene-containing styrene-butadiene block copolymers may, for example, be linear two-block S-B copolymers or three-block S-B-S or B-S-B copolymers, for example (S=styrene block, B=butadiene block), these being obtained via anionic polymerization by the process of the invention. The way in which the block structure arises is essentially that styrene and/or α-methylstyrene alone is first polymerized anionically, giving a styrene block. Once the styrene monomers have been consumed the monomer is changed by adding monomeric butadiene and polymerizing this anionically to give a butadiene block ("sequential polymerization"). The resultant two-block S-B polymer may be polymerized to give a three-block S-B-S polymer by again changing the monomer to styrene, if desired. The same principle applies for B-S-B three-block copolymers.

In the S-B-S three-block copolymers, the two styrene blocks may be of the same size (same molecular weight, i.e. symmetrical $S_1$-B-$S_1$ structure) or of different size (different molecular weight, i.e. asymmetrical $S_1$-B-$S_2$ structure). The same principle applies for the two butadiene blocks of the B-S-B block copolymers. Block sequences S-S-B or $S_1$-$S_2$-B, or S-B-B or S-$B_1$-$B_2$ are, of course, also possible. The indices above represent the block sizes (block lengths or molecular weights). The block sizes depend on the amounts of monomers used and the polymerization conditions, for example.

Instead of the elastomeric "soft" butadiene blocks B, or in addition to the blocks B, there may also be B/S blocks. These are likewise soft and contain butadiene, and styrene and/or α-methylstyrene, where the monomer units in the polymer chain are for example randomly distributed or in the form of a tapered structure (tapered=gradient from styrene-rich to styrene-poor or vice versa). If the block copolymer contains two or more B/S blocks, the absolute amounts, and the relative proportions, of styrene and/or α-methylstyrene, and butadiene in each of the B/S blocks may be identical or different (giving different blocks $(B/S)_1$, $(B/S)_2$, etc.).

Other suitable styrene-butadiene block copolymers are four-block and polyblock copolymers.

The block copolymers mentioned may have a linear structure (described above). However, branched or star-shaped structures are also possible and are preferred for some applications. Branched block copolymers are obtained in a known manner, e.g. by graft reactions of polymeric "side branches" onto a main polymer chain.

An example of a method for obtaining star-shaped block copolymers is reaction of the living anionic chain ends with an at least bifunctional coupling agent. Examples of descriptions of these coupling agents are found in U.S. Pat. Nos. 3,985,830, 3,280,084, 3,637,554, and 4,091,053. Preference is given to epoxidized glycerides (e.g. epoxidized linseed oil or soy oil), silicon halides, such as $SiCl_4$, or divinylbenzene, or else polyfunctional aldehydes, ketones, esters, anhydrides, or epoxides. Other compounds suitable specifically for dimerization are dichlorodialkylsilanes, dialdehydes, such as terephthalaldehyde, and esters, such as ethyl formate. Coupling of identical or different polymer chains may be used to prepare symmetrical or asymmetrical star structures, i.e. each of the branches in the star may be identical or different, and in particular may contain different blocks S, B, B/S, or different block sequences. Further details relating to star-shaped block copolymers can be found in WO-A 00/58380, for example.

The monomer names styrene and butadiene used above are given by way of example but also include other vinylaromatics and dienes, respectively.

The α-methylstyrene-containing styrene-butadiene block copolymers are in accordance with the invention as long as at least one block has been prepared by the process of the invention. This means that it is not necessary for all of the blocks to be prepared by the process of the invention. For example, it is possible for at least one block to be polymerized according to the invention using an initiator composition comprising potassium hydride and organylaluminum compound, and for one or more other blocks of the same block copolymer to be prepared by another process not of the invention, for example using organolithium compounds or organomagnesium compounds.

The high impact α-methylstyrene-containing polystyrene (HIPS) of the invention comprises, besides the polystyrene matrix, a rubber component, such as polybutadiene, polyisoprene, or—preferably—styrene-butadiene block copolymers.

The rubber component here may be prepared by the process of the invention or else by processes of the prior art, e.g. by anionic polymerization using organolithium compounds for example, or by free-radical polymerization.

In the case of rubbers prepared by anionic polymerization, the rubber is generally present in solution in a solvent or in monomeric styrene. In the process of the invention, the rubbers do not need to be removed from the solvent (although this is also possible). Instead, the solution of the rubber with solvent may be used directly for further processing to give the HIPS.

To this end, monomeric styrene and/or α-methylstyrene, and the initiator composition composed of KH and organylaluminum compound, are added to the rubber solution which, where appropriate, has previously been brought to completion of its reaction by way of addition of chain terminator, and the mixture is polymerized anionically by the inventive process, i.e. styrene and/or α-methylstyrene is polymerized in the presence of the rubber.

Other inventive polymers are i) a HIPS comprising rubber prepared according to the invention, where the polystyrene matrix has been polymerized in the presence of the rubber by a process other than the inventive process, and ii) a HIPS comprising rubber not prepared according to the invention, where the polystyrene matrix composed of α-methylstyrene and optionally comonomers such as styrene has been polymerized in the presence of the rubber by the inventive process.

The inventive HIPS therefore encompasses those HIPS polymers in which either the rubber component or the polystyrene matrix, or both constituents, comprise α-methylstyrene, and which have been prepared by the inventive process.

Particular preference is given to toughened polystyrene molding compositions in which the rubber present comprises
a) a styrene-butadiene two-block $S_1$-$B_1$ copolymer with styrene content of from 30 to 70% by weight, preferably from 40 to 60% by weight, based on the two-block copolymer, or
b) a mixture of the two-block copolymer described in a) with a second styrene-butadiene two-block $S_2$-$B_2$ copolymer with styrene content of from 10 to 50% by weight, preferably from 20 to 40% by weight, based on the two-block copolymer, or
c) a mixture of the two-block copolymer described in a) with a styrene-butadiene-styrene three-block S-B-S copolymer with styrene content of from 5 to 75% by weight, preferably from 20 to 50% by weight, based on the three-block copolymer. The three-block copolymer used particularly preferably comprises an $S_1$-B-$S_2$ polymer in which the styrene block $S_1$ has a weight-average molecular weight Mw of from 20 000 to 200 000, preferably from 50 000 to 120 000, the butadiene block B has a Mw of from 30 000 to 300 000, preferably from 100 000 to 200 000, and the styrene block $S_2$ has a Mw of from 1000 to 100 000, preferably from 5000 to 30 000.

In the case of the styrene-butadiene block copolymers, the process of the invention moreover permits control of the content of 1,2-vinyl linkages in the polybutadiene block or polyisoprene block. Since the mechanical properties of these polymers are also determined by the 1,2-vinyl content of the polybutadiene or polyisoprene, the process therefore permits the preparation of styrene-butadiene block copolymers with tailored properties.

The polymers of the invention also have low content of residual monomers or residual oligomers. This advantage is particularly significant in the case of styrene-containing or α-methylstyrene-containing polymers, because the low content of residual monomers and of residual oligomers of styrene or of α-methylstyrene makes it unnecessary to carry out any subsequent devolatilization—e.g. in a vented extruder, this being associated with higher costs and disadvantageous thermal degradation of the polymer (depolymerization).

To increase tensile strain at break, from 0.1 to 10% by weight, preferably from 0.5 to 5% by weight, of mineral oil (white oil), based on the toughened polystyrene, may be added to the inventive toughened polystyrene.

The polymers may comprise conventional additives and processing aids, e.g. lubricants, mold-release agents, colorants, e.g. pigments or dyes, flame retardants, antioxidants, light stabilizers, fibrous and pulverulent fillers, fibrous and pulverulent reinforcing agents, or antistatic agents, or else other additives, or a mixture of these.

Examples of suitable lubricants and mold-release agents are stearic acids, stearyl alcohol, stearic esters, stearamides, metal stearates, montan waxes, and those based on polyethylene and polypropylene.

Examples of pigments are titanium dioxide, phthalocyanines, ultramarine blue, iron oxides, and carbon black, and also the class of organic pigments. For the purposes of the present invention, dyes are any of the dyes which can be used for the transparent, semitransparent or non-transparent coloring of polymers, in particular those suitable for the coloring of styrene homo- and copolymers. Dyes of this type are known to the skilled worker.

Examples of flame retardants which may be used are the halogen-containing or phosphorus-containing compounds known to the skilled worker, magnesium hydroxide, and other commonly used compounds, or a mixture of these.

Examples of suitable antioxidants (heat stabilizers) are sterically hindered phenols, hydroquinones, various substituted representatives of this group, and also mixtures of these. They are commercially available in the form of Topanol® or Irganox®, for example.

Examples of suitable light stabilizers are various substituted resorcinols, salicylates, benzotriazoles, benzophenones, HALS (hindered amine light stabilizers), for example those commercially available in the form of Tinuvin®.

Examples which may be mentioned of fibrous or pulverulent fillers are carbon fibers or glass fibers in the form of glass wovens, glass mats, or glass silk rovings, chopped glass, glass beads, and also wollastonite, particularly preferably glass fibers. When glass fibers are used, these may have been provided with a size and with a coupling agent to improve compatibility with the components of the blend. The glass fibers incorporated may either be short glass fibers or else continuous-filament strands (rovings).

Suitable particulate fillers are carbon black, amorphous silica, magnesium carbonate, chalk, powdered quartz, mica, bentonites, talc, feldspar, or in particular calcium silicates, such as wollastonite, and kaolin.

Examples of suitable antistatic agents are amine derivatives, such as N,N-bis(hydroxyalkyl)alkylamines or -alkyleneamines, polyethylene glycol esters, or glycerol mono- and distearates, and also mixtures of these.

Each of the additives is used in the respective usual amounts, and no further details need therefore be given here.

The molding compositions of the invention may be prepared by mixing processes known per se, for example with melting in an extruder, Banbury mixer, kneader, or on a roll mill or calender. However, the components may also be mixed "cold", the mixture composed of powder or pellets not being melted and homogenized until processing begins.

It is preferable for the components, where appropriate with the additives mentioned, to be mixed in an extruder or any other mixing apparatus at from 100 to 320° C., with melting, and discharged. It is particularly preferable to use an extruder.

The molding compositions may be used to produce moldings (or semifinished products, unsupported films, supported films, or foams) of any type. The invention therefore also provides the use of the inventive polymers for producing moldings, films, fibers, or foams, and the moldings, films, fibers, or foams obtainable from the polymers.

The inventive process can prepare homo- and copolymers of α-methylstyrene with improved cost-effectiveness. The inventive polymers feature a balanced property profile, in particular through small contents of residual monomers and residual oligomers of styrene and α-methylstyrene, and also through good heat distortion resistances.

EXAMPLES

All of the reactions were carried out in a glove box with exclusion of moisture under a blanket of nitrogen. The following compounds were used, purified here meaning aluminoxane purification and drying.
styrene, purified from BASF
α-methylstyrene, purified from BASF
butadiene, purified from BASF
potassium hydride, as solid from Aldrich triisobutylaluminum (TIBA) as 1.0 molar solution in toluene, ready-to-use solution from Aldrich (n-butyl)(sec-butyl)magnesium (abbreviated to: dibutyl-magnesium, DBM) as 2.0 molar solution in heptane sec-butyllithium (S-BuLi) as 12% strength by weight solution in cyclohexane, ready-to-use solution from Chemmetall sodium hydride, as solid from Aldrich cyclohexane, purified, from BASF toluene, purified, from BASF methanol, from BASF n-octadecyl 3-(3,5-di-tert-butyl-4-hydroxyphenyl)propionate; Irganox® 1076 from Ciba Specialty Chemicals was used white oil; Winog® 70 mineral oil from Wintershall was used 2-ethylhexanoic acid.

1. Preparation of Initiator Compositions 1.1 Initiator Compositions In1 to In3: KH+TIBA (inventive)

4 g of solid potassium hydride formed an initial charge at 50° C., and the following were added, with stirring for initiator comp. In1: 10 ml of toluene and 90 ml of the 1.0 molar TIBA solution, and for initiator comp. In2: 30 ml of toluene and 70 ml of the 1.0 molar TIBA solution, and for initiator comp. In3: 60 ml of toluene and 40 ml of the 1.0 molar TIBA solution.

The mixture was then left to age for 5 hours at 50° C., with stirring. The Al/K molar ratio was for In1: 0.9:1 for In2: 0.7:1 for In3: 0.4:1.

1.2 Initiator Compositions In4C to In8C (for Comparison)

a) In4C and In5C: S-BuLi+dibutylmagnesium (DBM)

The following were mixed at 23° C., with stirring for In4C: 13 ml of toluene and 23 ml of the 12% strength by weight S-BuLi solution with 64 ml of the 2.0 molar DBM solution, and for In5C: 28 ml of the 12% strength by weight S-BuLi solution with 72 ml of the 2.0 molar DBM solution.

The mixture was then left to age for 60 min at 23° C., with stirring. The molar Mg/Li ratio was 4:1 in each of the two instances In4C and In5C, and the Li concentration was for In4C, 0.32 mol/l, and for In5C, 0.39 mol/l.

b) In6C: S-BuLi alone: The 12% strength by weight S-BuLi solution was used alone.

c) In7C and In8C: S-BuLi+TIBA and, respectively, NaH+TIBA

The following were mixed at 25° C., with stirring for In7C: 39 ml of toluene and 71 ml of the 12% strength by weight S-BuLi solution with 90 ml of the 1.0 molar TIBA solution, and for In8C: 10 ml of toluene and 2.4 g of solid sodium hydride with 90 ml of the 1.0 molar TIBA solution.

The mixture was then left to age for 60 min at 25° C., with stirring.

The Al/Li molar ratio for In7C was 0.9:1, and the Al/Na molar ratio for In8C was 0.9:1.

2. Preparation and Properties of α-methylstyrene Copolymers

The molecular weights given below for the polymers (weight-average $M_w$ and number-average $M_n$) were determined by gel permeation chromatography (GPC). The details were as follows: eluent tetrahydrofuran; flow rate 1.2 ml/min; RI or UV detector; three styrene-divinylbenzene gel separating columns (35° C., each 300×8 mm), PLgel Mixed B from Polymer Laboratories; calibration using polystyrene standards or polybutadiene standards, depending on the polymer obtained.

Polydispersity $M_w/M_n$ was calculated from $M_w$ and $M_n$.

α-Methylstyrene proportion in the copolymers was determined by recording and evaluating $^1H$ nuclear resonance spectra ($^1H$ NMR, nuclear magnetic resonance).

Glass transition temperature was determined by Differential Scanning Calorimetry (DSC). Details were: start temperature 23° C., stop temperature 200° C., heating rate 1° C./min, determination during second run.

Vicat B heat distortion resistance was determined as Vicat softening point VSP, method B50 (force 50 N, heating rate 50° C./h) to EN ISO 306, on test specimens produced to EN ISO 3167.

Residual monomer content, i.e. residual content of styrene, butadiene, or α-methylstyrene in the polymer, was determined by gas chromatography.

2.1 Examples 1 to 8C: Preparation of α-methylstyrene-styrene Copolymer

In the following general specification, the variables (capital letters) are the parameters varied and the results obtained. Table 1 gives the individual values.

30 ml of a monomer mixture composed of 50% by volume of α-methylstyrene and 50% by volume of styrene formed an initial charge, with stirring, which was heated to 100° C. Initiator composition In was then added to this and the mixture was held at 100° C. while the fall-off in monomer concentration was monitored gravimetrically. 5 hours after addition of initiator, the reaction was terminated by adding 1 ml of methanol. Conversion at this juncture was U %.

The polymer was precipitated from the resultant reaction mixture by adding methanol, and the precipitated polymer was filtered off and dried in a drying cabinet. The following were determined on the resultant powder:

molecular weights $M_w$ and $M_n$, and polydispersity $M_w/M_n$, using GPC

α-methylstyrene proportion Y, using $^1H$ NMR glass transition temperature Tg, using DSC.

TABLE 1

α-Methylstyrene-styrene copolymer (nd: not determined)

| Example | Initiator composition In | Conversion U [%] | Molar mass $M_n$ [g/mol] | Polydispersity $M_w/M_n$ | Proportion of α-MeS Y [%] | Glass transition temperature Tg [° C.] |
|---|---|---|---|---|---|---|
| 1 | 3 ml In1 | 80 | 8900 | 2.4 | 37 | 115 |
| 2 | 3 ml In2 | 78 | 17500 | 2.4 | 27 | 98/123[1)] |
| 3 | 3 ml In3 | 94 | 11700 | 2.1 | 46 | 128 |
| 4C | 10 ml In4C | 59 | 3700 | 1.5 | 16 | nd |
| 5C | 13 ml In5C | 77 | 2000 | 1.7 | 25 | nd |

TABLE 1-continued

α-Methylstyrene-styrene copolymer (nd: not determined)

| Example | Initiator composition In | Conversion U [%] | Molar mass $M_n$ [g/mol] | Polydispersity $M_w/M_n$ | Proportion of α-MeS Y [%] | Glass transition temperature Tg [° C.] |
|---|---|---|---|---|---|---|
| 6C | 2.2 ml In6C | 61 | 4600 | 1.3 | 16 | 105 |
| 7C | 3 ml In7C | 60 | 5350 | 1.7 | 16 | 109 |
| 8C | 3 ml In8C | 55 | 3700 | 1.5 | 7 | 102 |

[1] The DSC graph indicated two glass transition temperatures

The table shows that the inventive process can prepare α-methylstyrene-styrene copolymers with a variable property profile.

In the non-inventive comparative examples, use was made of non-inventive initiator compositions composed of organyllithium compound and organylmagnesium compound (S-BuLi+DBM, comparative examples 4C and 5C), of organyllithium compound alone (S-BuLi, comparative example 6C), of organyllithium compound and organylaluminum compound (S-BuLi+TIBA, comparative example 7C), or of sodium hydride and organylaluminum compound (NaH+TIBA, comparative example 8C). The resultant polymers have only low molar masses $M_n$ of from 2000 to about 5400 g/mol, low proportions of α-methylstyrene of from 7 to 25%, and insufficient glass transition temperatures of from 102 to 109° C.

In contrast, when an initiator composition composed of potassium hydride and organylaluminum compound (KH+TIBA, Examples 1 to 3) is used according to the invention, the polymers obtained have considerably higher molar masses $M_n$ of from 8900 to 17500 g/mol, higher proportions of α-methylstyrene, from 27 to 46%, and higher glass transition temperatures, from 115 to 128° C.

2.2 Example 9: Preparation of styrene-butadiene two-block copolymer rubber with α-methylstyrene in the styrene block 370 ml of toluene formed an initial charge, with stirring, and 2 ml of the initiator composition In2 were added. The mixture was then heated to 100° C., and 100 ml of butadiene were added. 2 hours after addition of the butadiene, 100 ml of a mixture composed of 50% by volume of α-methylstyrene and 50% by volume of styrene were added at 100° C. The mixture was held at 100° C., and the fall-off in monomer concentration was monitored gravimetrically. 5 hours after addition of the styrene, the reaction was terminated by adding 1 ml of methanol. Conversion at this juncture was 81%.

The resultant reaction mixture was freed from solvents, and the properties of the resultant polymer granules were determined, both as described above in 2.1.

The number-average molar mass $M_n$ was 120500 g/mol, and the polydispersity $M_w/M_n$ was 2.5. The proportion of α-methylstyrene in the entire block copolymer was 18%.

2.3 Example 10: Preparation of Toughened Polystyrene (HIPS)

The rubber component used for the HIPS was a linear styrene-butadiene-styrene three-block copolymer which (not according to the invention) was prepared as follows, using S-BuLi as sole initiator:

391 kg of toluene formed an initial charge in a stirred tank of capacity 2 m³, and were temperature-controlled to 45° C. 258 g of the 12% strength by weight solution of sec-butyllithium in cyclohexane were added. The following monomer portions M1 to M6 were then added successively to the mixture, the next portion being added only once the internal temperature of the reactor, which in the intervening period had risen, had reverted to 45–55° C. as a result of evaporative cooling: M1, 11.6 kg of styrene; M2, 25 kg of butadiene; M3, 19.5 kg of butadiene; M4, 16.9 kg of butadiene; M5, 13 kg of butadiene; M6, 44.2 kg of styrene. The above styrene portion M6 was added when the internal temperature of the reactor was higher by 10° C. than the temperature prior to the last butadiene addition M5. Finally, the reaction was terminated by adding 8.4 g of water. The solids content of the reaction mixture was 25.2% by weight, and the mixture was diluted to 16% by weight solids content by adding 78 kg of styrene and 215 kg of α-methylstyrene. The rubber solution therefore comprised 16% by weight of rubber, 39% by weight of toluene, 12% by weight of styrene, and 33% by weight of α-methylstyrene.

According to GPC analysis, the block copolymer had monomodal distribution. The residual monomer content of the block copolymer was smaller than 10 ppm (by weight) of butadiene, as determined by gas chromatography.

The peak molecular weights M (molecular weight distribution maximum) of the resultant block copolymer rubber were: first styrene block 20 000, butadiene block 160 000, second styrene block 95 000, as determined by GPC as described above. Butadiene content was 59.5% by weight.

By virtue of the final dilution step (see above), α-methylstyrene was present at this juncture in the rubber solution thus obtained. The rubber solution was polymerized as follows by the inventive process, using an initiator composition composed of KH and TIBA to give the HIPS:

The polymerization was carried out continuously in a double-walled 50 l stirred tank, using a standard anchor stirrer. The reactor was designed for an absolute pressure of 25 bar, and also with a heating medium, and temperature-controlled by evaporative cooling for isothermal conduct of reactions.

2.7 kg/h of styrene, 13.4 kg/h of the rubber solution, and 70 g/h of the initiator composition In2 were metered continuously into the stirred tank, with stirring at 115 rpm, and were held with the internal temperature of the reactor at from 110 to 120° C. Conversion at the outlet of the stirred tank was 38%. The reaction mixture was conveyed into a stirred 29 l tower reactor provided with two heating zones of equal size (first zone 110° C., second zone 160° C. internal temperature). The discharge from the tower reactor was treated with 787 g/h of an additive solution (see below), then passed through a mixer, and finally passed through a tubular section heated to 250° C. The mixture was then conveyed by way of a pressure-control valve into a partial evaporator operated at 270° C., and depressurized into a vacuum vessel operated at an absolute pressure of 5 mbar and at 280° C.

The polymer melt was discharged using a conveying screw, and pelletized. Conversion was quantitative.

The additive solution was composed of 2% by weight of Irganox® 1076, 15% by weight of toluene, 9% by weight of 2-ethylhexanoic acid, and 74% by weight of white oil.

The residual monomer content of the HIPS, determined by gas chromatography, was less than 5 ppm of styrene, less than 5 ppm of ethylbenzene, and less than 100 ppm of α-methylstyrene, in each case in ppm by weight, ppm(w).

The Vicat B heat distortion resistance of the polymer pellets was determined as 128° C. to EN ISO 306.

The inventive examples show that the inventive process can prepare either homo- or copolymers of α-methylstyrene cost-effectively. The polymers featured low contents of residual monomer and of oligomer, and also good heat distortion resistance.

We claim:

1. A process for preparing homopolymers of α-methylstyrene, or copolymers of α-methylstyrene and comonomers, comprising anionic polymerization in the presence of an initiator composition, in which potassium hydride and at least one organylaluminum compound are present.

2. The process according to claim 1, wherein the comonomers used comprise styrene, butadiene, isoprene, or a mixture of these.

3. The process according to claim 1, wherein the organylaluminum compound used comprises triisobutylaluminum (TIBA).

4. The process according to claim 1, wherein the molar ratio of aluminum to potassium in the initiator composition is from 0.2:1 to 10:1.

5. The process according to claim 1, wherein the initiator composition is prepared by mixing potassium hydride and the organylaluminum compound suspended or dissolved in an inert hydrocarbon, and permitting the mixture to age at a temperature of from 0 to 250° C. for at least 2 minutes.

6. The process according to claim 2, wherein the organylaluminum compound used comprises triisobutylaluminum (TIBA).

7. The process according to claim 2, wherein the molar ratio of aluminum to potassium in the initiator composition is from 0.2:1 to 10:1.

8. The process according to claim 3, wherein the molar ratio of aluminum to potassium in the initiator composition is from 0.2:1 to 10:1.

9. The process according to claim 2, wherein the initiator composition is prepared by mixing potassium hydride and the organylaluminum compound suspended or dissolved in an inert hydrocarbon, and permitting the mixture to age at a temperature of from 0 to 250° C. for at least 2 minutes.

10. The process according to claim 3, wherein the initiator composition is prepared by mixing potassium hydride and the organylaluminum compound suspended or dissolved in an inert hydrocarbon, and permitting the mixture to age at a temperature of from 0 to 250° C. for at least 2 minutes.

11. The process according to claim 4, wherein the initiator composition is repared by mixing potassium hydride and the organylaluminum compound suspended or dissolved in an inert hydrocarbon, and permitting the mixture to age at a temperature of from 0 to 250° C. for at least 2 minutes.

* * * * *